UNITED STATES PATENT OFFICE.

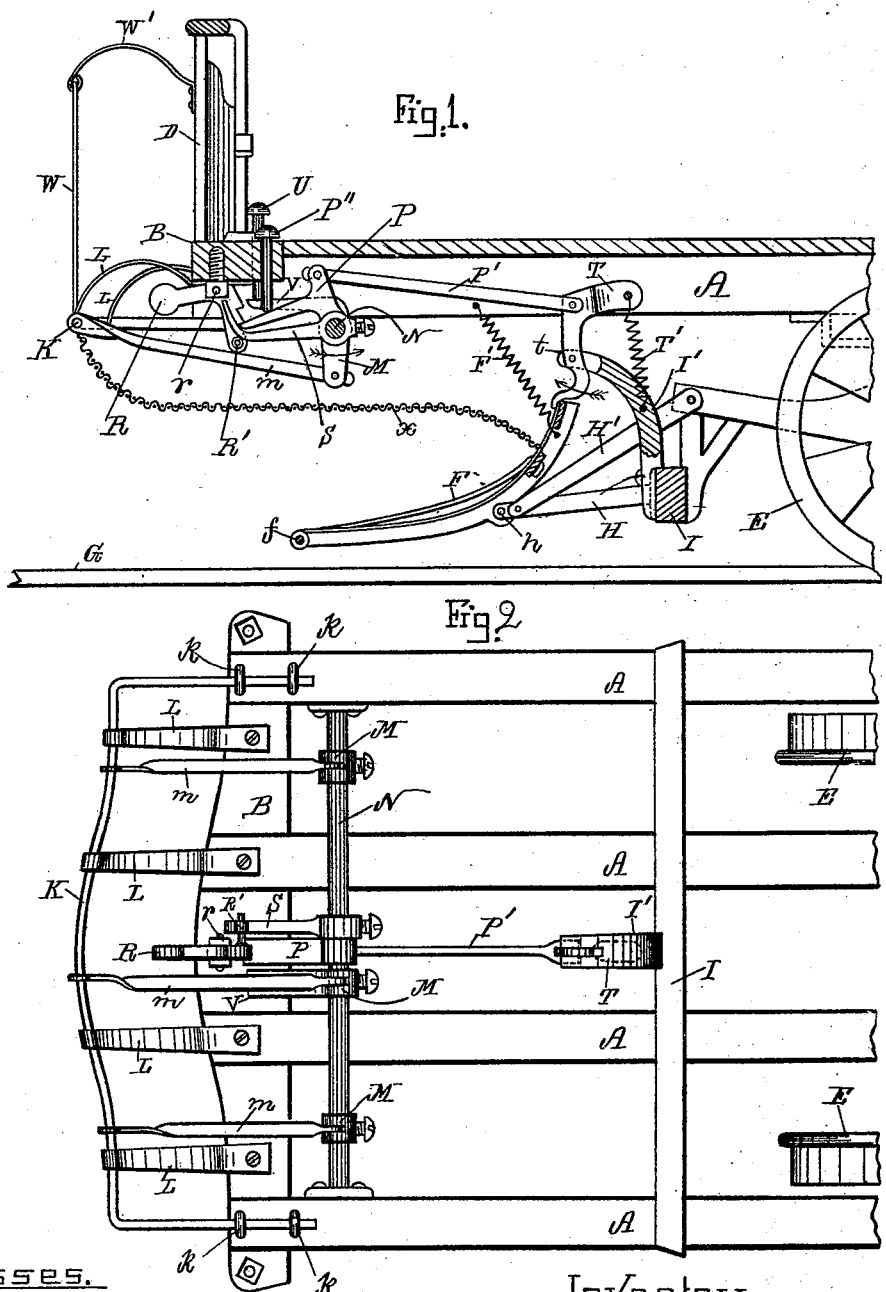

JOSEPH N. WIECZOREK, OF BOSTON, MASSACHUSETTS.

CAR-FENDER.

SPECIFICATION forming part of Letters Patent No. 544,779, dated August 20, 1895.

Application filed January 15, 1895. Serial No. 534,970. (No model.)

*To all whom it may concern:*

Be it known that I, JOSEPH N. WIECZOREK, a citizen of the United States, and a resident of Boston, in the county of Suffolk and State of Massachusetts, have invented new and useful Improvements in Car-Fenders, of which the following, taken in connection with the accompanying drawings, is a specification.

This invention relates to improvements in car-fenders for electric or other motor propelled cars, and is carried out as follows, reference being had to the accompanying drawings, wherein—

Figure 1 represents a longitudinal section of the invention, and Fig. 2 represents a bottom plan view of the same.

Similar letters refer to similar parts wherever they occur on the different parts of the drawings.

A A represent the floor-beams, B the end beam, and C the floor, of a motor-propelled car, as usual.

D represents the dasher, and E E the wheels.

F represents the curved fender, the forward end *f* of which is normally held raised sufficiently above the track G so as to pass freely over it. The fender F is pivoted about midway between its upper and lower ends at *h* to a support H, secured to the stationary cross-beam I, as shown.

H' is a link or bar secured in its forward end to the fender-support H and in its rear end to any stationary part of the under-rigging of the car, by which a strong triangular bracket is produced on which to hang the fender, as shown.

K is a sliding buffer-frame arranged in front of the car end, and it is guided in bearings *k k*, secured to the under side of the car-body. To such buffer-frame K and end beam B are secured a number of yielding springs L L, which serve to hold the buffer-frame K normally pushed forward, as shown in the drawings. To the buffer-frame K are hinged or otherwise loosely connected the links *m m*, the rear ends of which are pivoted to arms or levers M M, secured to a rock-shaft N, journaled in suitable bearings attached to the car-frame, as shown. On the shaft N is loosely hung a locking pawl or lever P, adapted to engage with the rear toothed surface of a weighted locking-lever R, pivoted below the car end at *r* and provided at its lower end with a side projection or roller R', as shown. To the rock-shaft N is attached a preferably curved or inclined releasing-lever S, adapted to come in contact with the pin or projection R' on the lock-lever R when the shaft N is rocked. P' is a rod or link connected at its forward end to the pawl-lever P and at its rear end to the fender lock-lever T, which is pivoted at *t* to a bracket I', secured to the cross-beam I or other stationary part of the car-frame. The lower end of the fender lock-lever T bears against or hooks over the upper end of the fender F, and thus serves to hold said fender normally raised above the track, as shown in Fig. 1.

F' is a spring connected to the upper end of the fender and to the under side of the car-frame, as shown in Fig. 1, and it serves to aid in swinging the fender against the track as soon as released from the lock-lever T.

T' is another similar spring secured to the lock-lever T and to the bracket I' or other stationary part, so as to aid in tripping said lever as it is being released from the fender.

P'' is a pedal-bolt going loosely through the car-platform, its lower end resting on the pawl or lever P, as shown.

U is another pedal-bolt going loosely through the car-platform and having its lower end resting on a lever V, secured to the rock-shaft N.

W is a yielding buffer arranged in front of the dasher D to prevent a person or object that may be struck by the moving car from coming in hard contact with the dasher or front end of the car. Said buffer is attached in its upper end to springs W' and in its lower end to the yielding frame K, as shown in Fig. 1.

X is a flexible apron made, preferably, of wire-netting or other suitable material, which apron is attached in its forward end to the front portion of the frame K and in its rear end to the upper part of the fender F, as shown in Fig. 1, so as to prevent a person lying on the track from coming in contact with the under side of the car-platform or its mechanism.

The operation of the invention is as follows: The fender F and mechanism for its operation are normally held in the position shown in the drawings. In case a person or object is struck by the buffer W or yielding frame K the links m and levers M cause the shaft N to be rocked in the direction of arrow shown in Fig. 1, and in so doing the pawl-lever S trips the lock-lever R sufficiently to disengage it from the pawl P, (which is loose on the shaft N.) The moment the pawl P is liberated the fender lock-lever T is moved on its fulcrum in the direction of arrow shown in Fig. 1 by the influence of the spring T' sufficiently to disengage its lower end from the upper end of the fender F, the forward end of which is then automatically swung against the track by its own gravity, aided by the influence of the spring F'. (Shown in Fig. 1.)

In case the motorman should perceive a person or object on the track ahead of the moving car, he can lower the forward end of the fender F simply by depressing the pedal-bolt U, which, acting on the lever V, attached to the rock-shaft N, causes the latter to turn in the direction of the arrow shown in Fig. 1, by which the pawl P is liberated from the lock-lever R, the fender lock-lever T released from the fender by the spring T', and the forward end of the fender swung against the track by its own gravity, aided by the spring F', as before stated. After the obstacle on the track has been removed the fender is raised to its normal position (shown in Fig. 1) simply by depressing the pedal-bolt P'', causing the pawl P to be locked in position at the same time as the fender locking-lever T assumes its normal position for holding the fender F raised, as shown in Fig. 1.

What I wish to secure by Letters Patent and claim is—

1. In combination a pivoted car fender a spring pressed pivoted locking lever for holding it normally raised above the track and connected to a loosely hung pawl, a pivoted locking lever engaging said pawl and a yielding frame or buffer connected to a rock shaft and a tripper lever for releasing the lock lever from said pawl when an object is struck substantially as and for the purpose set forth.

2. In combination a pivoted car fender a spring pressed pivoted locking lever for holding it normally raised above the track and connected to a loosely hung pawl a pivoted locking lever engaging said pawl and a pedal bolt adapted to impart movement to a rock shaft and release the pawl from its locking lever substantially as and for the purpose set forth.

In testimony whereof I have signed my name to this specification, in the presence of two subscribing witnesses, on this 29th day of December, A. D. 1894.

JOSEPH N. WIECZOREK.

Witnesses:
ALBAN ANDRÉN,
LAURITZ N. MÖLLER.